United States Patent
Nakano et al.

(10) Patent No.: US 7,079,491 B2
(45) Date of Patent: Jul. 18, 2006

(54) METHOD AND NODE APPARATUS FOR FILTERING ICMP DATA FRAME

(75) Inventors: Masayoshi Nakano, Fukuoka (JP);
Fumiharu Etoh, Fukuoka (JP);
Tomoyuki Furutono, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1179 days.

(21) Appl. No.: 09/805,607

(22) Filed: Mar. 13, 2001

(65) Prior Publication Data

US 2002/0003775 A1    Jan. 10, 2002

(30) Foreign Application Priority Data

Jul. 10, 2000  (JP)  ............................. 2000-208855

(51) Int. Cl.
*H04J 1/16* (2006.01)
(52) U.S. Cl. ........................ 370/242; 370/389; 370/401
(58) Field of Classification Search ................ 370/401, 370/400, 389, 392, 241, 242, 244, 245
See application file for complete search history.

(56) References Cited

U.S. PATENT DOCUMENTS

| | | | | |
|---|---|---|---|---|
| 6,147,976 A | * | 11/2000 | Shand et al. ................. | 370/254 |
| 6,230,271 B1 | * | 5/2001 | Wadlow et al. ............. | 713/201 |
| 6,321,338 B1 | * | 11/2001 | Porras et al. ................ | 713/201 |
| 6,526,056 B1 | * | 2/2003 | Rekhter et al. ............. | 370/392 |
| 6,603,769 B1 | * | 8/2003 | Thubert et al. ............. | 370/401 |
| 6,631,137 B1 | * | 10/2003 | Lorrain et al. .............. | 370/401 |
| 6,747,957 B1 | * | 6/2004 | Pithawala et al. .......... | 370/252 |

FOREIGN PATENT DOCUMENTS

JP        07210473        8/1995

* cited by examiner

*Primary Examiner*—Ricky Q. Ngo
*Assistant Examiner*—Richard Chang
(74) *Attorney, Agent, or Firm*—Katten Muchin Rosenman LLP

(57) ABSTRACT

A node apparatus is provided for transmitting an ICMP data frame to a transmission source in response to an IP data frame received from the transmission source when detecting failure regarding the IP data frame. The node apparatus includes an information database storing information about necessity of generating the ICMP data frame for each attribute of the ICMP data frame corresponding to a type of the failure, an information management unit determining the necessity of generating the ICMP data frame by referring to the information database when the node apparatus detects the failure, and a processing unit generating the ICMP data frame if the information management unit determines that generation of the ICMP data frame is necessary, wherein the node apparatus transmits the ICMP data frame to the transmission source if the processing unit generates the ICMP data frame.

11 Claims, 12 Drawing Sheets

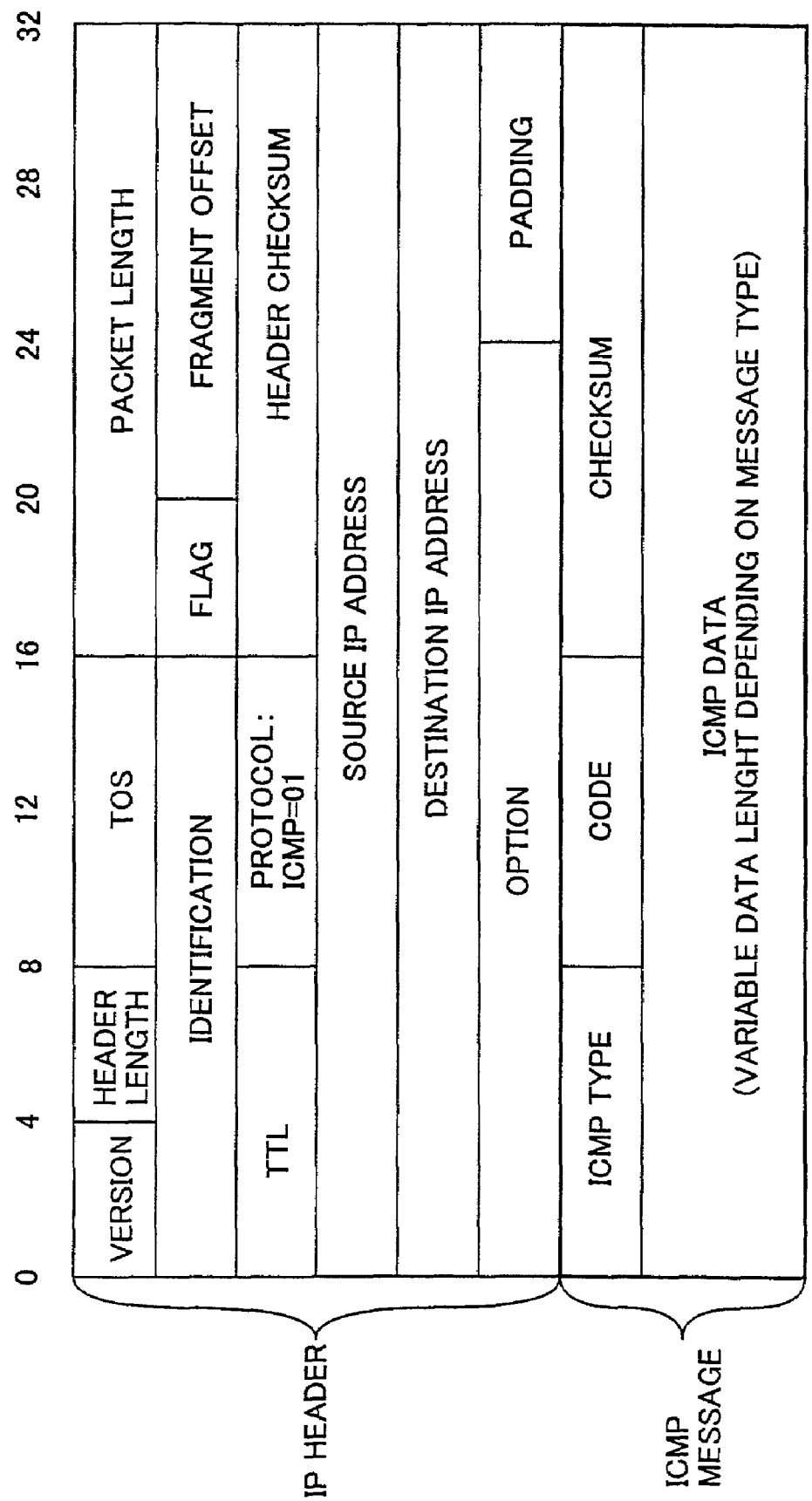

FIG.10

| TYPE OF ICMP DATA FRAME (HEXADECIMAL NUMBER) | CONTENTS OF TYPE | CODE OF ICMP DATA FRAME (HEXADECIMAL NUMBER) | CONTENTS OF CODE | NECESSITY OF GENERATING ICMP DATA FRAME | NECESSITY OF TRANSMITT-ING ICMP DATA FRAME | TRANS-MISION RATE OF ICMP DATA FRAME |
|---|---|---|---|---|---|---|
| 03 | UNABLE TO REACH DESTINATION | 00 | UNABLE TO REACH NETWORK | YES | YES | 10% |
| | | 01 | UNABLE TO REACH HOST | YES | YES | 50% |
| | | 02 | UNABLE TO REACH PROTOCOL | YES | YES | 50% |
| | | 03 | UNABLE TO REACH PORT | YES | YES | 60% |
| 04 | RESTRAIN TRANSMISSION | — | RESTRAIN TRANSMISSION | NO | NO | 0% |
| 05 | CHANGE ROUTE | 00 | CHANGE NETWORK ROUTE | YES | YES | 20% |
| | | 01 | CHANGE HOST ROUTE | YES | YES | 30% |
| | | 02 | CHANGE TOS AND PROTOCOL | YES | YES | 9% |
| | | 03 | CHANGE TOS AND HOST NETWORK | YES | YES | 90% |
| ... | | | ... | | | |
| 08 | REQUEST FOR ECHO | | REQUEST FOR ECHO | | | 0% |

METHOD AND NODE APPARATUS FOR FILTERING ICMP DATA FRAME

BACKGROUND OF THE INVENTION

1. Field of the Invention

The present invention relates to a method and a node apparatus for filtering an ICMP (Internet Control Message Protocol) data frame. More particularly, the present invention relates to a method and a node apparatus for filtering an ICMP data frame in a network system having functions to transmit and receive the ICMP data frame.

2. Description of the Related Art

An ICMP is known as a protocol utilized for notifying of an error and other relevant information during data transmission on Internet layers through networks using a TCP/IP (Transmission Control protocol/Internet Protocol).

FIG. 1 is a diagram showing a process to generate an ICMP data frame. In a case of transmitting an IP data frame from a node apparatus Y through a node apparatus A to a node apparatus Z, the node apparatus A receives the IP data frame from the node apparatus Y, recognizes a destination address stored in the IP data frame, and attempts to transmits the IP data frame to the node apparatus Z. However, the IP data frame cannot be transmitted to the node apparatus Z, since the node apparatuses A and Z are not connected to each other, as shown in FIG. 1. Subsequently, the node apparatus A detects such a transmission failure, generates an ICMP data frame to notify the node apparatus Y that the IP data frame received from the node apparatus Y cannot be transmitted to the node apparatus Z, and returns the ICMP data frame to the node apparatus Y.

For each data frame transmitted from a node apparatus, an ICMP data frame is returned to the node apparatus if the data frame cannot reach its destination. Accordingly, in a case in which a large number of data frames are unable to reach their destinations, the same number of ICMP data frames are returned to their source node apparatuses, and thus congestion of processes at a communication node or congestion of communication lines may occur, thereby causing a failure of transmission to other proper data frames. Especially, transmission of ICMP data frames can be used by hackers and crackers who maliciously cause network failures as a means to generate the congestion of processes at the communication node and the congestion of communication lines.

Japanese Laid-Open Patent Application No. 7-210473 discloses a method of using transmission paths as resources efficiently, and of expanding a function to control congestion, by evaluating an attribute of data to be transmitted in addition to a type of a transmission path which the data is transmitted through, a destination address of the data, and a network protocol type of the data, by classifying the data based on the evaluation of the data, and then, by determining whether transmission of the data is necessary, and executing a data filtering control to determine a transmission rate of the data, based on the classification. The disclosed method is applied to a node receiving data from other nodes as an object of the data filtering control. Thus, a cause of congestion of such as networks is not considered in the disclosed method, the cause including generation of an ICMP data frame having a new protocol attribute at a node apparatus, and transmission of the ICMP data frame to a source node apparatus of a data frame, in a case in which the data frame cannot be transmitted to its destination for some reason, or in a case in which a problem is found in a datagram. Consequently, receiving a large number of IP data frames at a node apparatus, and transmitting the large number of ICMP data frames from the node apparatus back to source node apparatuses of the data frames cause an increase in network traffic and congestion of networks.

SUMMARY OF THE INVENTION

Accordingly, it is a general object of the present invention to provide a method and a node apparatus for filtering an ICMP (Internet Control Message Protocol) data frame. A more particular object of the present invention is to provide a method and a node apparatus for filtering an ICMP data frame that is to be generated and transmitted by the node apparatus, thereby preventing an increase in network traffic and congestion of networks.

The above-described object of the present invention is achieved by a method of transmitting an ICMP (Internet Control Message Protocol) data frame to a transmission source in response to an IP (Internet Protocol) data frame received from the transmission source when detecting failure regarding the IP data frame, the method including the steps of storing information about necessity of generating the ICMP data frame for each attribute of the ICMP data frame corresponding to a type of the failure, determining the necessity of generating the ICMP data frame by referring to the information when detecting the failure, generating the ICMP data frame if it is determined that generation of the ICMP data frame is necessary, and transmitting the ICMP data frame to the transmission source if the ICMP data frame is generated.

By restraining the generation of the ICMP data frame, based on the necessity of generating the ICMP data frame, a node apparatus can prevent an increase in the number of ICMP data frames transmitted to the transmission source of the IP data frame, thereby preventing an increase in network traffic and congestion of networks.

Other objects, features and advantages of the present invention will become more apparent from the following detailed description when read in conjunction with the accompanying drawings.

BRIEF DESCRIPTION OF THE DRAWINGS

FIG. 9 is a diagram showing a format of the ICMP data frame;

FIG. 10 is a diagram showing an ICMP information management database of the node apparatus according to the first embodiment;

DESCRIPTION OF THE PREFERRED EMBODIMENTS

A description will now be given of preferred embodiments of the present invention, with reference to the accompanying drawings.

Figure 1:
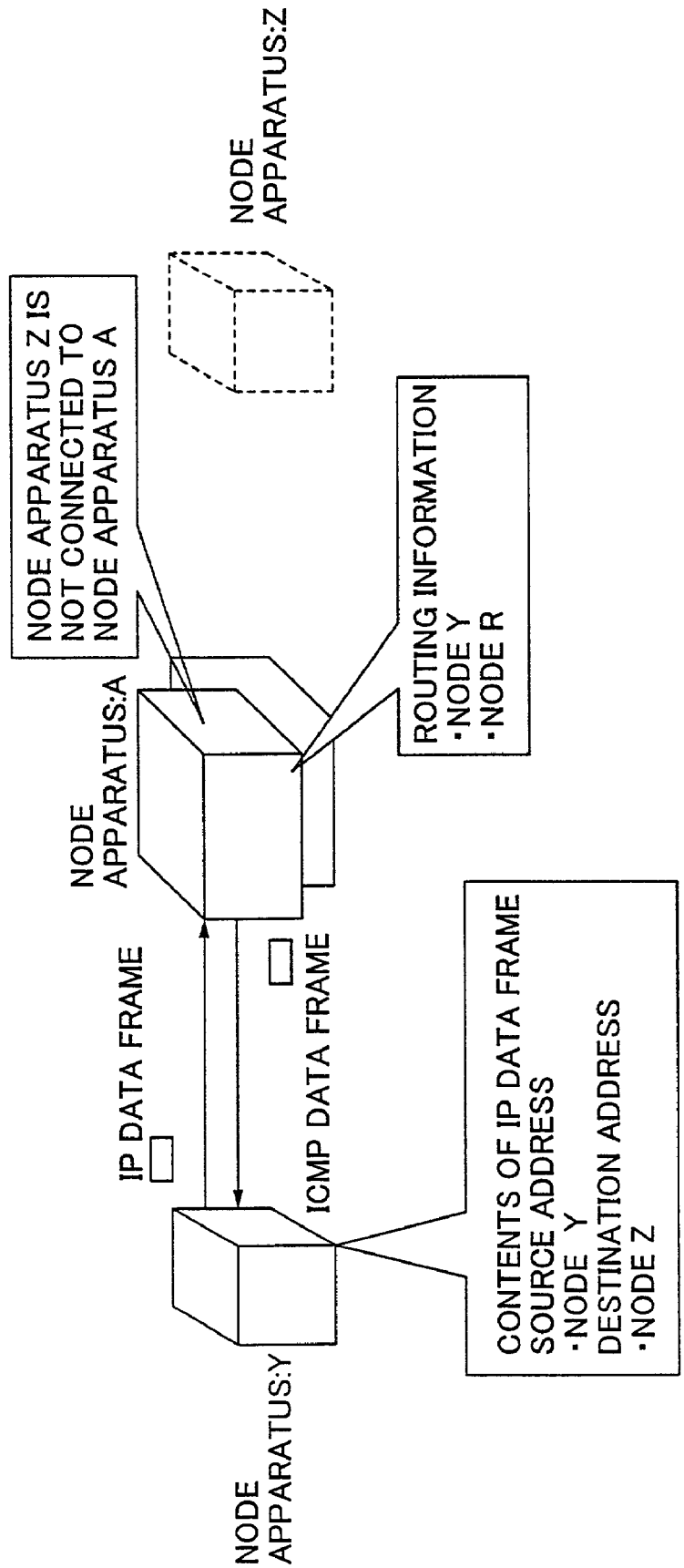
FIG. 1 is a diagram showing a process to generate an ICMP data frame.
Figure 2:
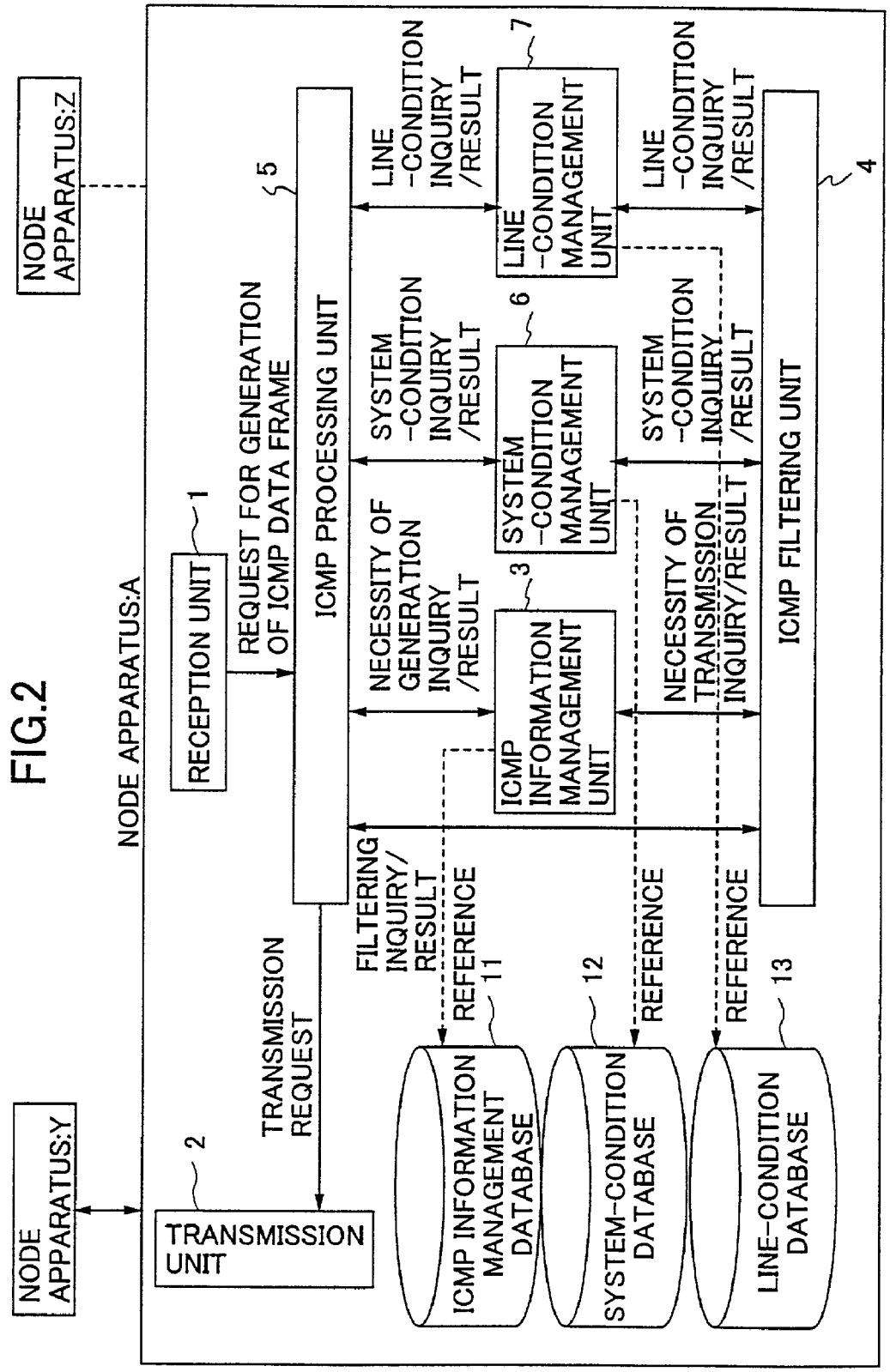
FIG. 2 is a block diagram showing a configuration of a node apparatus according to a first embodiment of the present invention.

FIG. 2 is a block diagram showing a configuration of a node apparatus according to a first embodiment of the present invention. FIG. 2 shows only a configuration of a node apparatus A. However, configurations of the other nodes Y and Z are the same as that of the node apparatus A. The node apparatus A shown in FIG. 2 includes a reception unit 1, a transmission unit 2, an ICMP information management unit 3, an ICMP filtering unit 4, an ICMP processing unit 5, a system-condition management unit 6, a line-condition management unit 7, an ICMP information management database 11, a system-condition database 12 and a line-condition database 13.

At the node apparatus A, the reception unit 1 receives data frames including an ICMP data frame transmitted by other node apparatuses connected to the node apparatus A. The transmission unit 2 transmits data frames including an ICMP data frame to other node apparatuses connected to the node apparatus A. The ICMP information management unit 3 manages information about necessity of data-frame transmission and a transmission rate of ICMP data frames for each attribute of the ICMP data frame including a type and a code of the ICMP data frame, corresponding to a type of a failure, by using the ICMP information management database 11.

The ICMP processing unit 5 generates an ICMP data frame corresponding to the information managed by the ICMP information management unit 3. To be concrete, the ICMP processing unit 5 decides to generate an ICMP data frame at a fixed rate or not to generate the ICMP data frame, based on the attribute of the ICMP data frame. Additionally, the ICMP processing unit 5 requests the ICMP filtering unit 4 to transmit the generated ICMP data frame. The ICMP filtering unit 4 executes filtering on the ICMP data frame requested by the ICMP processing unit 5 to be transmitted, based on the information managed by the ICMP information management unit 3, the information including the necessity of the data-frame transmission and the transmission rate of the ICMP data frame. In other words, the ICMP filtering unit 4 filters the ICMP data frame by deciding to transmit the ICMP data frame at a fixed rate or not to transmit the ICMP data frame, based on the attribute of the ICMP data frame. Accordingly, the above-described decision on generation and transmission of an ICMP data frame based on an attribute of the ICMP data frame prevents the node apparatus A from outputting a large number of ICMP data frames, thereby improving processing performance of the node apparatus A, achieving efficient networks, and preventing congestion of the networks.

The system-condition management unit 6 utilizes an existing technology to manage a condition of the node apparatus A, by using the system-condition database 12. Similarly, the line-condition management unit 7 utilizes an existing technology to manage conditions of lines connected to the node apparatus A, by using the line-condition database 13. The ICMP processing unit 5 and the ICMP filtering unit 4 adjust respectively generation and transmission of the ICMP data frame, based not only on the information about the necessity of the data frame transmission and the transmission rate of the ICMP data frame, but also on information about a condition of the node apparatus A managed by the system-condition management unit 6 and a line condition of a destination of the ICMP data frame managed by the line-condition management unit 7. In other words, the ICMP processing unit 5 decides to generate the ICMP data frame or not to generate the ICMP data frame, based on the condition of the node apparatus A and of lines, in addition to the attribute of the ICMP data frame. Similarly, the ICMP filtering unit 4 decides to transmit the ICMP data frame or not to transmit the ICMP data frame, based on the condition of the node apparatus A and of the lines, in addition to the attribute of the ICMP data frame. Accordingly, the above-described decision on generation and transmission of an ICMP data frame based not only on an attribute of the ICMP data frame, but also on a condition of the node apparatus A and conditions of the lines, enables efficient filtering on the ICMP data frame, thereby preventing the node apparatus A from outputting a large number of ICMP data frames, thereby improving processing performance of the node apparatus A, achieving efficient networks, and preventing congestion of the networks.

Figure 3:
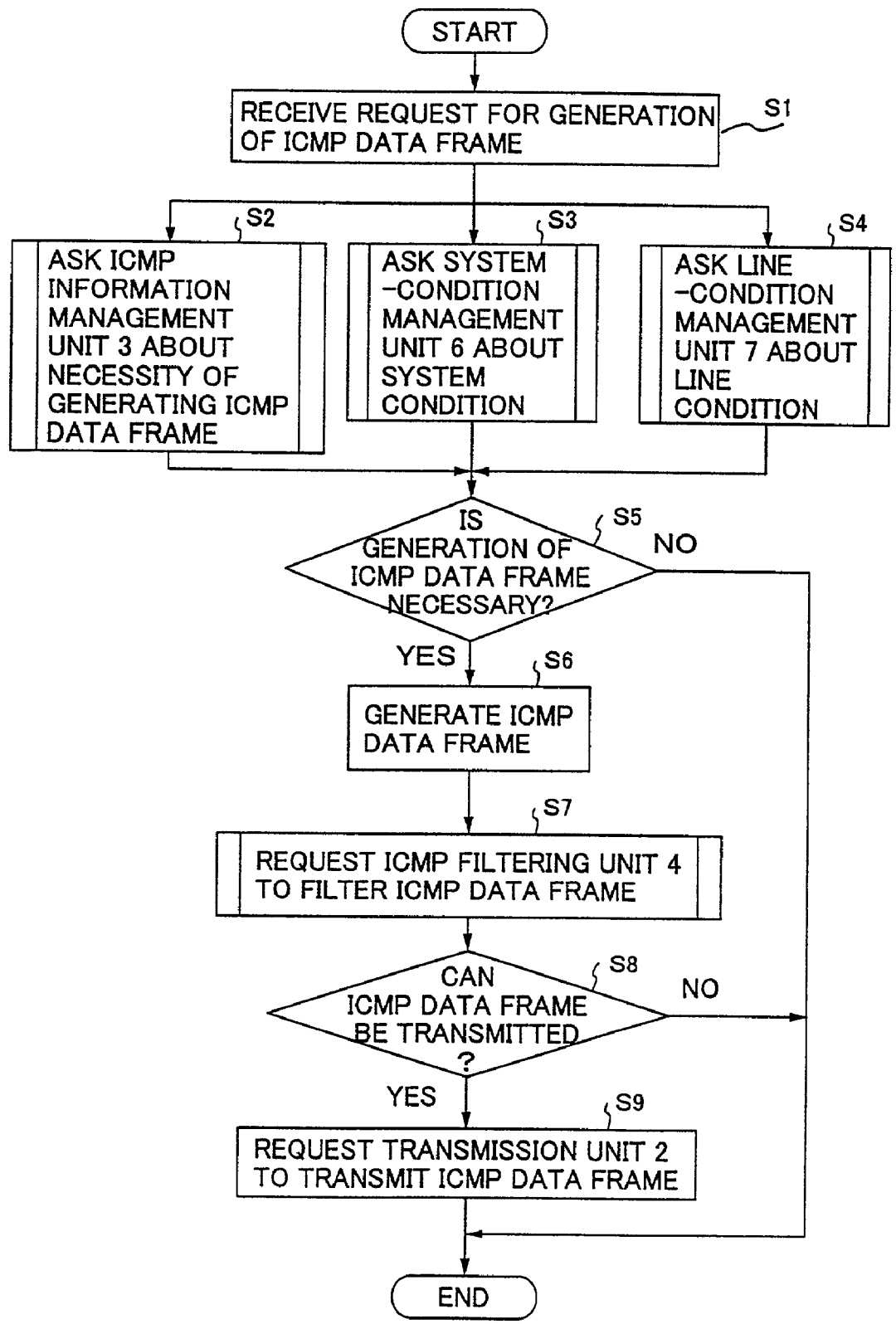
FIG. 3 is a flowchart showing a process executed by an ICMP processing unit of the node apparatus according to the first embodiment.

FIG. 3 is a flowchart showing a process executed by the ICMP processing unit 5 of the node apparatus A according to the first embodiment. The following steps are performed by the ICMP processing unit 5 after receiving a request for generation of an ICMP data frame from the reception unit 1, at a step S1. The ICMP processing unit 5 asks the ICMP information management unit 3 about necessity of generating an ICMP data frame at a step S2, asks the system-condition management unit 6 about a system condition of the node apparatus A at a step S3, and asks the line-condition management unit 7 about a line condition at a step S4. Subsequently, the ICMP processing unit 5 determines whether the generation of the ICMP data frame is necessary, at a step S5. If not, the ICMP processing unit 5 executes no more steps. If it is determined at the step S5 that the generation of the ICMP data frame is necessary, the ICMP processing unit 5 proceeds to a step S6, and generates the ICMP data frame. At a step S7, the ICMP processing unit 5 requests the ICMP filtering unit 4 to filter the generated ICMP data frame. At a step S8, the ICMP processing unit 5 determines whether the ICMP data frame can be transmitted. If the ICMP data frame cannot be transmitted, the ICMP processing unit 5 executes no more steps for transmitting the ICMP data frame. If it is determined at the step S8 that the ICMP data frame cane be transmitted, the ICMP processing unit 5 requests the transmission unit 2 to transmit the ICMP data frame from the node apparatus A, at a step S9. In response to the request from the ICMP processing unit 5, the transmission unit 2 transmits the ICMP data frame from the node apparatus A.

Figure 4:
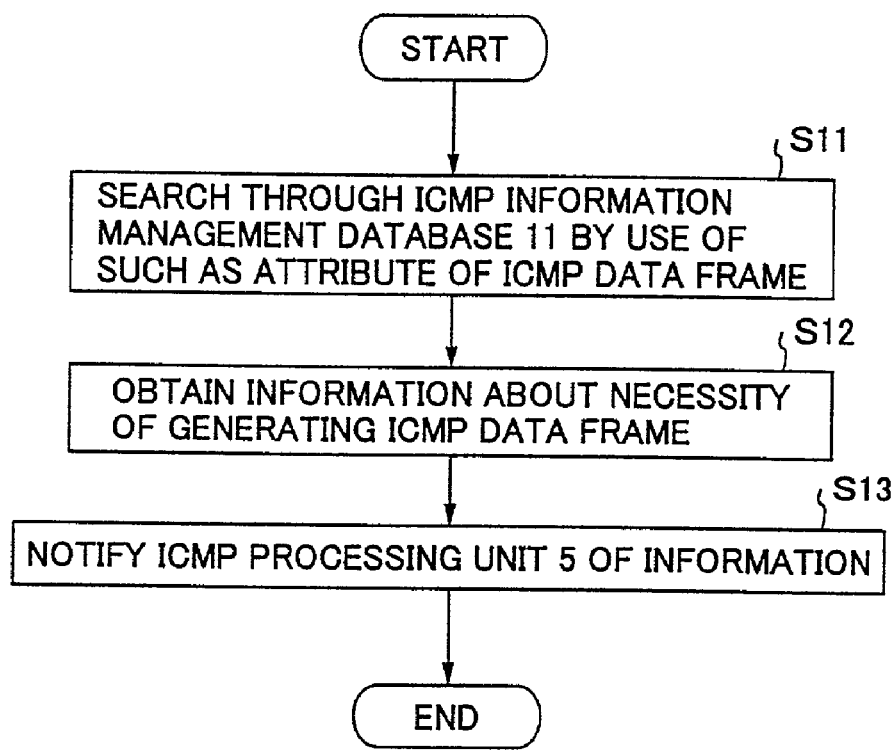
FIG. 4 is a flowchart showing a process executed by an ICMP information management unit of the node apparatus according to the first embodiment.

FIG. 4 is a flowchart showing a process executed by the ICMP information management unit 3 in response to the inquiry from the ICMP processing unit 5 at the step S2 shown in FIG. 3. After receiving the inquiry from the ICMP processing unit 5, the ICMP information management unit 3 searches through the ICMP information management database 11 by use of an attribute of an ICMP data frame corresponding to a type of failure, the attribute including a type and a code of the ICMP data frame, at a step S11. As a result, the ICMP information management unit 3 obtains information about necessity of generating the ICMP data frame, at a step S12. Subsequently, the ICMP information management unit 3 notifies the ICMP processing unit 5 of the information about the necessity of generating the ICMP data frame, at a step S13.

Figure 5:
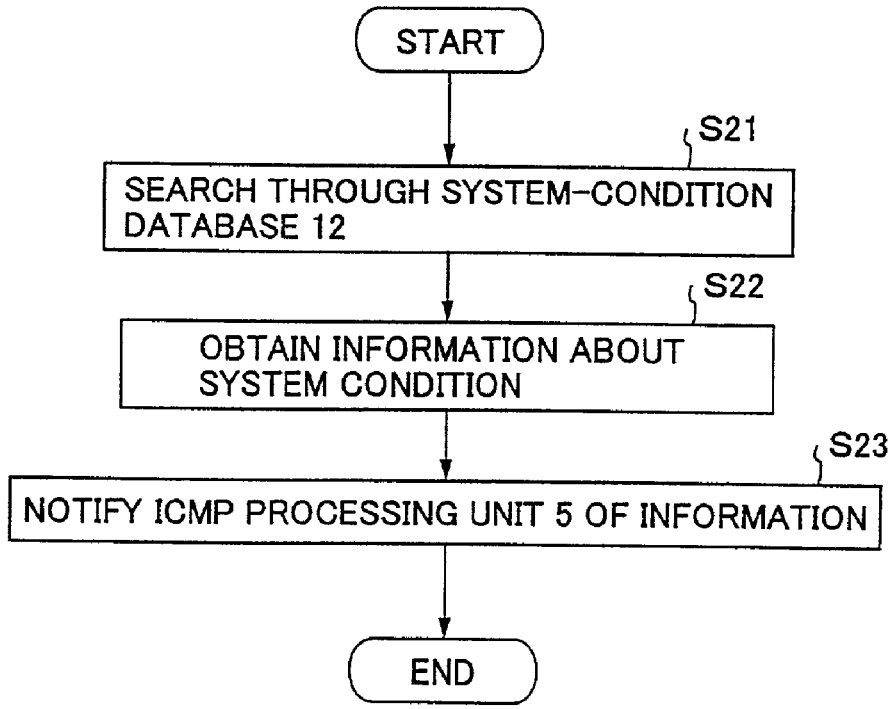
FIG. 5 is a flowchart showing a process executed by a system-condition management unit of the node apparatus according to the first embodiment.

FIG. 5 is a flowchart showing a process executed by the system-condition management unit 6 in response to the inquiry from the ICMP processing unit 5 at the step S3 shown in FIG. 3. After receiving the inquiry from the ICMP processing unit 5, the system-condition management unit 6 searches through the system-condition database 12, at a step S21. As a result, the system-condition management unit 6 obtains information about a system condition of the node apparatus A, at a step S22. Subsequently, the system-condition management unit 6 notifies the ICMP processing unit 5 of the information about the system condition of the node apparatus A, at a step S33.

Figure 6:
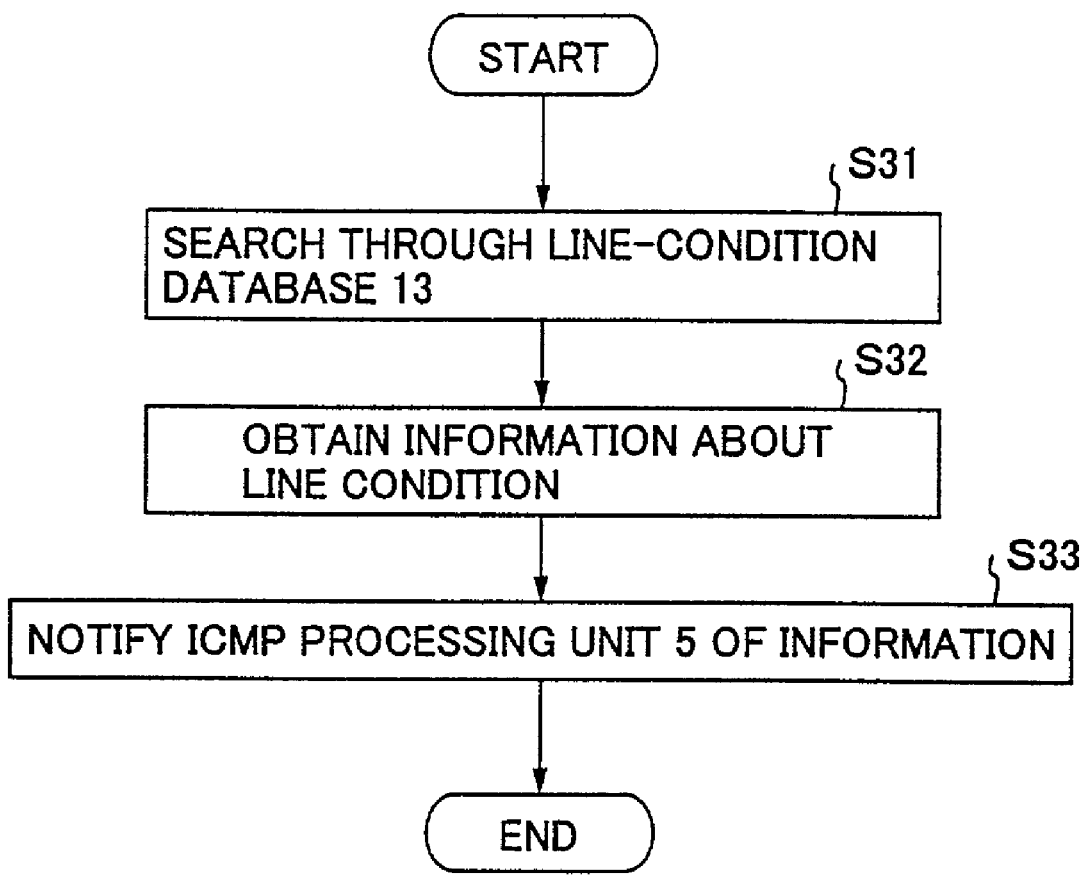
FIG. 6 is a flowchart showing a process executed by a line-condition management unit of the node apparatus according to the first embodiment.

FIG. 6 is a flowchart showing a process executed by the line-condition management unit 7 in response to the inquiry from the ICMP processing unit 5 at the step S4 shown in FIG. 3. After receiving the inquiry from the ICMP processing unit 5, the line-condition management unit 7 searches through the line-condition database 13, at a step S31. As a result, the line-condition management unit 7 obtains information about a condition of a line connected to a destination of the ICMP data frame, at a step S32. Subsequently, the line-condition management unit 7 notifies the ICMP processing unit 5 of the information about the condition of the line connected to the destination of the ICMP data frame, at a step S33.

Figure 7:
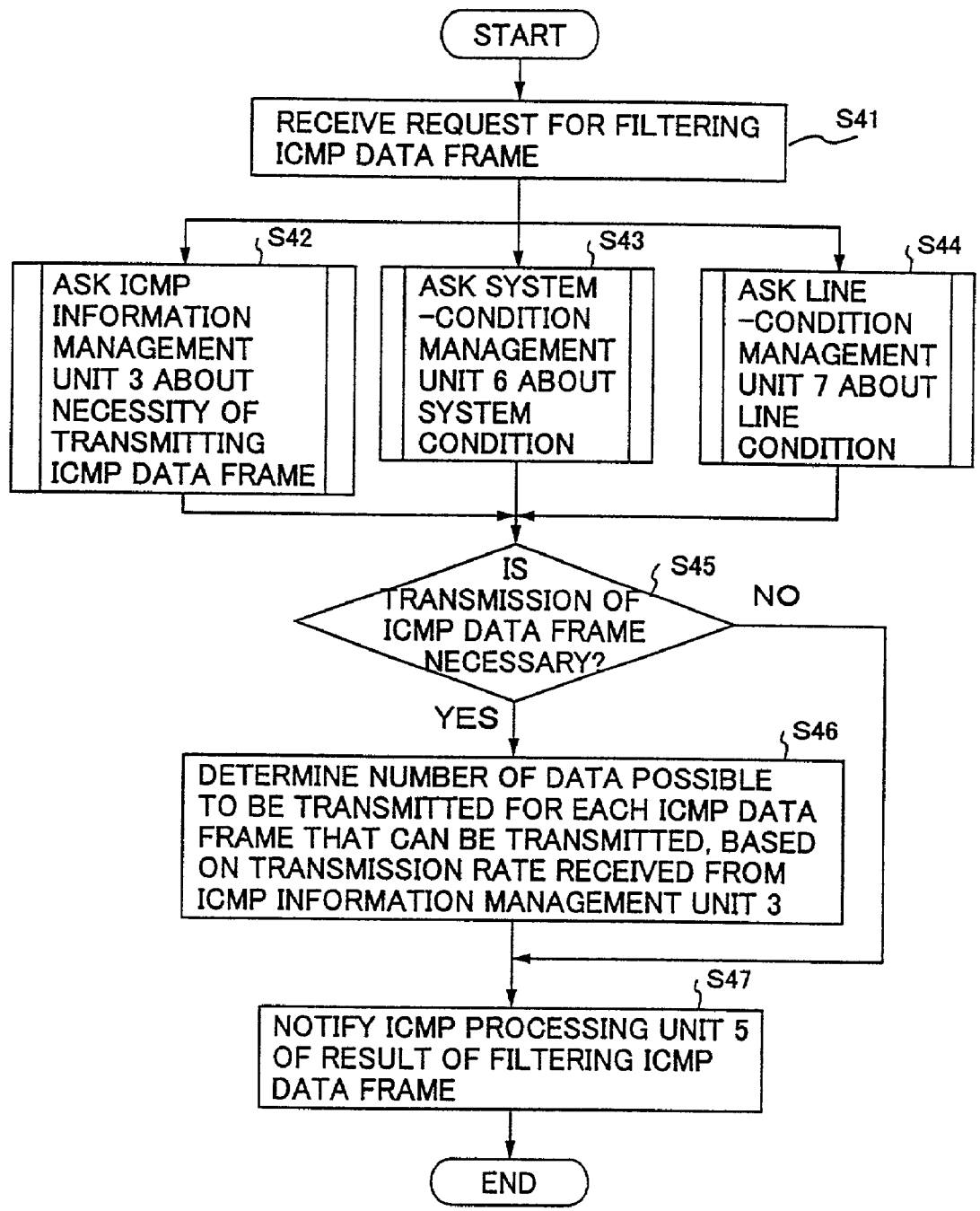
FIG. 7 is a flowchart showing a process executed by an ICMP filtering unit of the node apparatus according to the first embodiment.

FIG. 7 is a flowchart showing a process executed by the ICMP filtering unit 4 in response to the inquiry from the ICMP processing unit 5 at the step S7 shown in FIG. 3. After receiving the request from the ICMP processing unit 5 to filter the ICMP data frame at a step S41, the ICMP filtering unit 4 executes the following steps. The ICMP filtering unit 4 asks the ICMP information management unit 3 about necessity of transmitting the ICMP data frame at a step S42, asks the system-condition management unit 6 about the system condition of the node apparatus A at a step S43, and asks the line-condition management unit 7 about the line condition at a step S44. The ICMP information management unit 3 executes a later-described process shown in FIG. 8, in response to the step S42. The system-condition management unit 6 executes the process shown in FIG. 5, and returns a result to the ICMP filtering unit 4 in response to the step S43. Additionally, the line-condition management unit 7 executes the process shown in FIG. 6, and returns a result to the ICMP filtering unit 4 in response to the step S44. Subsequently, the ICMP filtering unit 4 determines whether the transmission of the ICMP data frame is necessary, at a step S45. If not, the ICMP filtering unit 4 proceeds to a step S47. If it is determined at the step S45 that the transmission of the ICMP data frame is necessary, the ICMP filtering unit 4 proceeds to a step S46, and determines the number of data possible to be transmitted in a unit time for each ICMP data frame that can be transmitted, based on a transmission rate directed by the ICMP information management unit 3, the transmission rate being a rate of ICMP data frames to be transmitted among a plurality of ICMP data frames generated corresponding to data frames received in a unit time, for instance, one second. Subsequently, the ICMP filtering unit 4 notifies the ICMP processing unit 5 of a result of filtering the ICMP data frame, in other words, information about whether the ICMP data frame can be transmitted, at the step S47.

Figure 8:
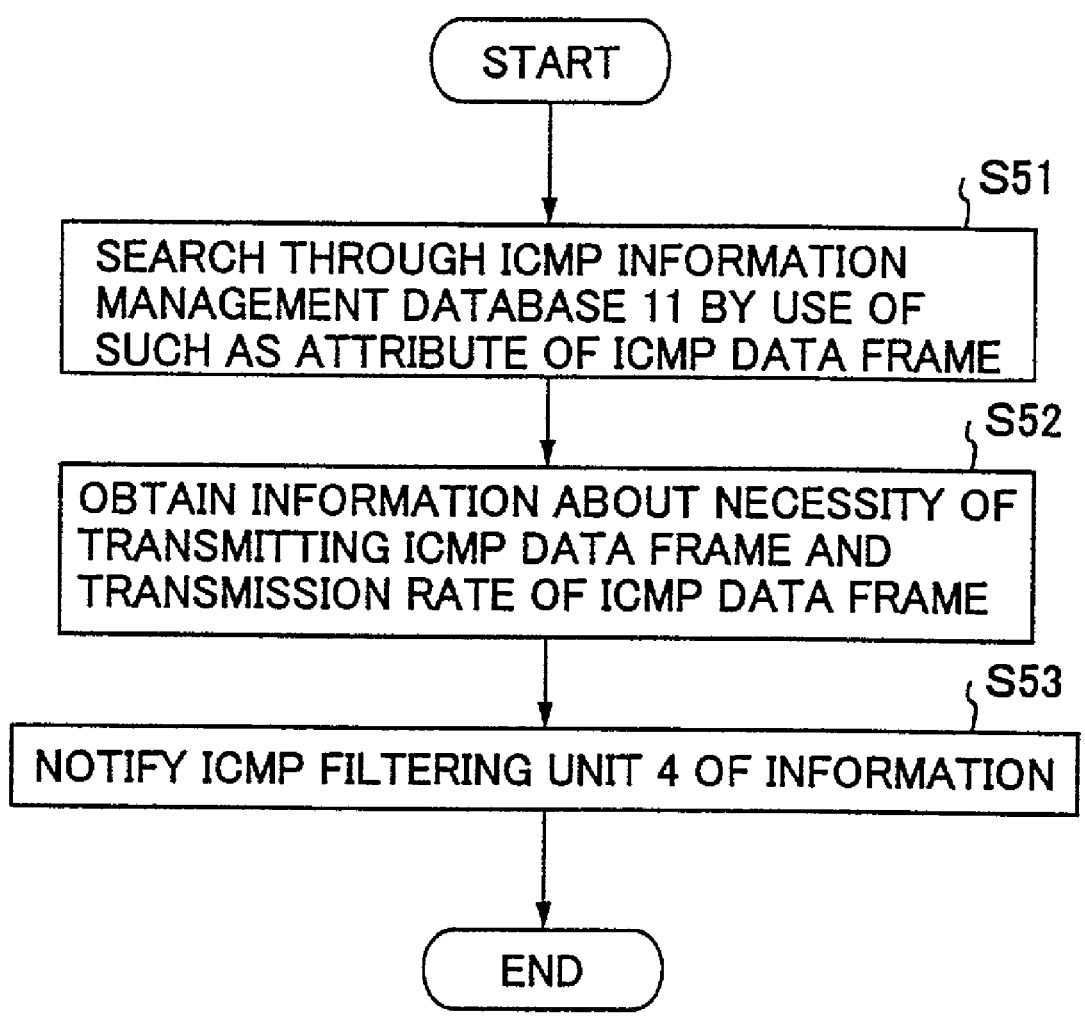
FIG. 8 is a flowchart showing another process executed by the ICMP information management unit of the node apparatus according to the first embodiment.

FIG. 8 is a flowchart showing a process executed by the ICMP information management unit 3 in response to the inquiry from the ICMP filtering unit 4 at the step S42 shown in FIG. 7. After receiving the inquiry from the ICMP filtering unit 4, the ICMP information management unit 3 searches through the ICMP information management database 11 by use of the attribute of the ICMP data frame including the type and the code of the ICMP data frame, at a step S51. As a result, the ICMP information management unit 3 obtains information about necessity of transmitting the ICMP data frame and a transmission rate of the ICMP data frame, at a step S52. Subsequently, the ICMP information management unit 3 notifies the ICMP filtering unit 4 of the information about the necessity of transmitting the ICMP data frame and the transmission rate of the ICMP data frame, at a step S53.

FIG. 9 is a diagram showing a format of an ICMP data frame. The ICMP data frame includes an IP header and an ICMP message. A first 26 bytes of the ICMP data frame is the IP header including areas for setting a version, a header length, a type of service (TOS), a packet length, an identification, a flag, a fragment offset, a time to live (TTL), a protocol (a protocol type), a header checksum, a source IP address, a destination IP address, an option and a padding. The ICMP message includes areas for setting an ICMP type, a code, a checksum and ICMP data. A data length of the ICMP data is variable depending on a message type.

FIG. 10 is a diagram showing an ICMP information management database 11. The ICMP information management database 11 registers information about each of necessity of generation, necessity of transmission and a transmission rate of an ICMP data frame, corresponding to a type and a code of the ICMP data frame. It should be noted that contents of the type and the code are provided on right sides of a type field and a code field of the ICMP information management database 11 respectively.

Figure 11:
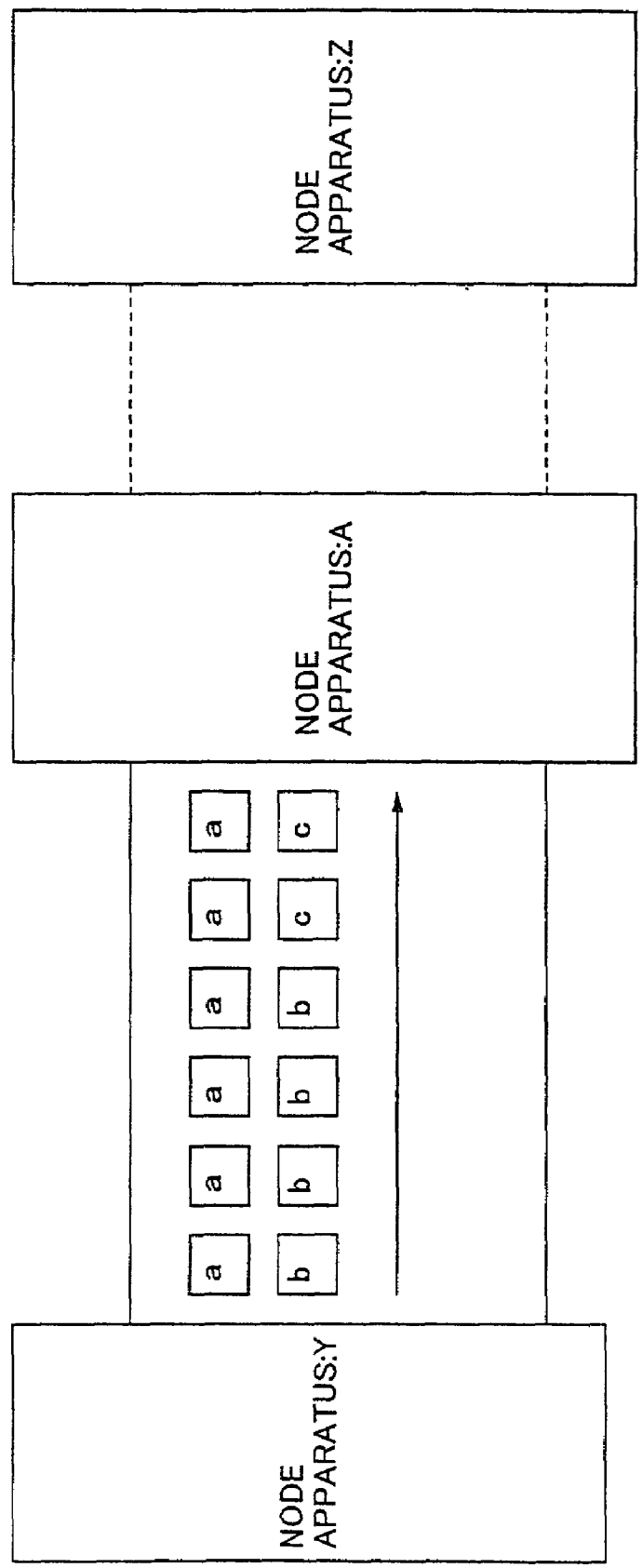
FIG. 11 is a first diagram showing a method of generating the ICMP data frame, according to a second embodiment of the present invention.
Figure 12:
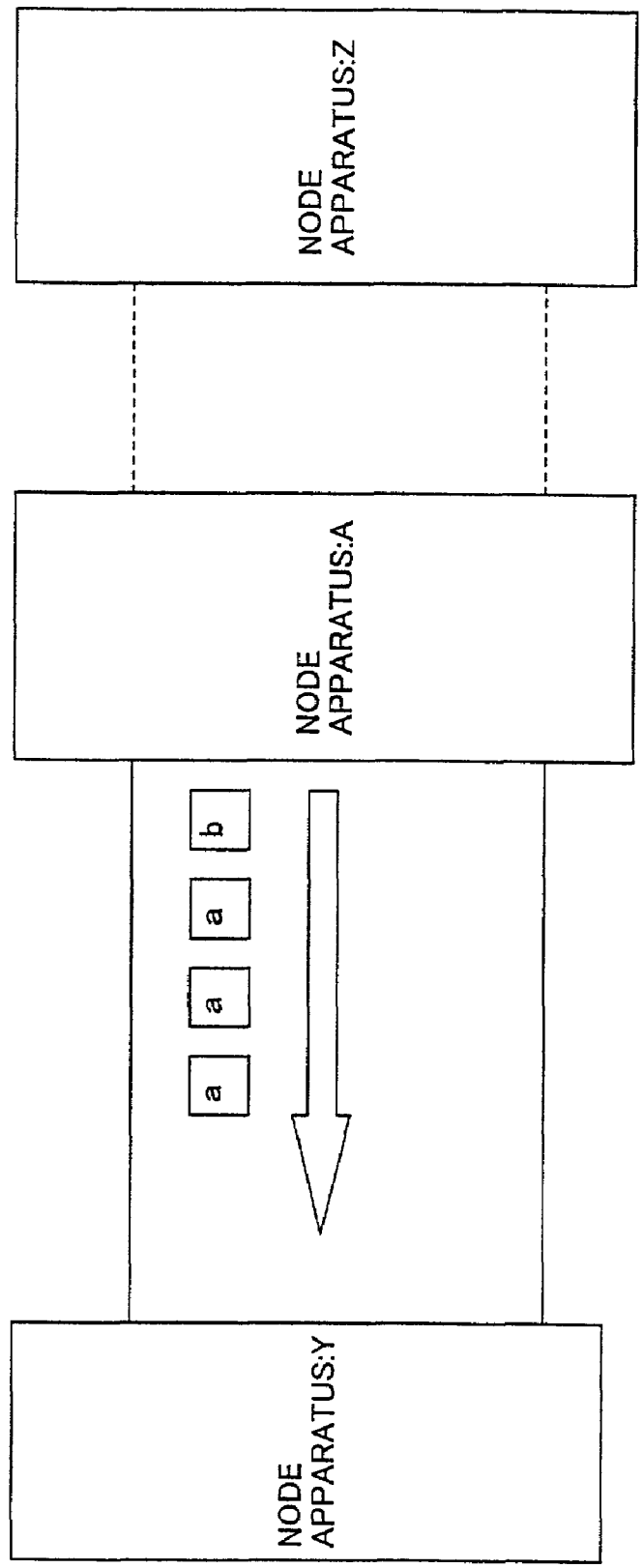
FIG. 12 is a second diagram showing the method of generating the ICMP data frame, according to the second embodiment.

A description will now be given of generation and filtering of an ICMP data frame in a case in which the node apparatus A receives IP data frames "a", "b" and "c" transmitted from the node apparatus Y though the node apparatus A to the node apparatus z, each IP data frame having a possibility of causing generation of an ICMP data frame at the node apparatus A. FIGS. 11 and 12 are diagrams showing a method of generating an ICMP data frame, according to a second embodiment of the present invention.

The node apparatus Y outputs six IP data frames "a" causing generation of an ICMP data frame whose type and code are respectively "03" and "01", four IP data frames "b" causing generation of an ICMP data frame whose type and code are respectively "05" and "01", and two IP data frames "c" causing generation of an ICMP data frame whose type is "04" in one second, as shown in FIG. 11. The ICMP data frame whose type and code are respectively "03" and "01" indicates that the IP data frame "a" cannot reach the node apparatus Z as a destination, since the IP data frame "a" cannot reach a host, based on the ICMP information management database 11. Similarly, the ICMP data frame whose type and code are respectively "05" and "01" indicates that a host route for transmitting the IP data frame "b" to the node apparatus Z is changed. Additionally, the ICMP data frame whose type is "04" indicates that transmission of the IP data frame "c" is restrained.

The node apparatus A receives the IP data frames transmitted from the node apparatus Y by use of the reception unit 1. Subsequently, the node apparatus A attempts to transmit the IP data frames to the node apparatus Z. However, the node apparatus A detects transmission failure at the reception unit 1, since the node apparatuses A and Z are not connected to each other. The reception unit 1 requests the ICMP processing unit 5 to generate ICMP data frames since the transmission of all the IP data frames received from the node apparatus Y is failed. The ICMP processing unit 5 notifies the ICMP information management unit 3 of causes of the transmission failure of the IP data frames "a", "b" and "c". The ICMP information management unit 3 determines that ICMP data frames corresponding to the IP data frames "a" and "b" are necessary to be generated, and that ICMP data frames corresponding to the IP data frames "c" is not necessary to be generated, by comparing the type "03" and the code "01" of the IP data frame "a", the type "05" and the code "01" of the IP data frame "b", and the type "04" of the IP data frame "c" with information stored in the ICMP information management database 11 shown in FIG. 10. Subsequently, the ICMP information management unit 3 notifies the ICMP processing unit 5 of the necessity of generating the ICMP data frames corresponding to the IP data frames "a", "b" and "c" in response to the request from the ICMP processing unit 5. After receiving the notification from the ICMP information management unit 3, the ICMP processing unit 5 generates ICMP data frames "a" corresponding to the IP data frames "a", and ICMP data frames "b" corresponding to the IP data frames "b", by following the format of an ICMP data frame shown in FIG. 9. It should be noted that the ICMP data frame "a" indicates that the IP data frame "a" cannot reach its destination, and that the ICMP data frame "b" indicates that a route of transmitting the IP data frame "b" is changed.

Additionally, the ICMP processing unit 5 requests the ICMP filleting unit 4 to determine whether the ICMP data frames "a" and "b" are necessary to be filtered. The ICMP filtering unit 4 asks the ICMP information management unit 3 about a result of filtering related to the ICMP data frames "a" and "b", after receiving the request from the ICMP processing unit 5. Subsequently, the ICMP information management unit 3 obtains information about the necessity of transmitting the ICMP data frames "a" and "b" from the ICMP information management database 11. The ICMP information management unit 3 also obtains filtering information indicating that transmission of the ICMP data frames "a" is necessary, and that a transmission rate of the ICMP data frames "a" is 50%. Additionally, the ICMP information management unit 3 obtains filtering information indicating that transmission of the ICMP data frames "b" is necessary, and that a transmission rate of the ICMP data frames "b" is 30%. The information management unit 3 notifies the ICMP filtering unit 4 of the above-described filtering information about the ICMP data frames "a" and "b" after obtaining the filtering information.

The ICMP filtering unit 4 decreases the number of the ICMP data frames "a" possible to be transmitted from six frames per second to three frames per second by referring to its transmission rate 50%, corresponding to the six IP data frames "a" received from the node apparatus Y in one second, based on the filtering information notified by the ICMP information management unit 3. Additionally, the ICMP filtering unit 4 decreases the number of the ICMP data frames "b" possible to be transmitted from four frames per second to one frame per second by referring to its transmission rate 30%, corresponding to the four IP data frames "b" received from the node apparatus Y in one second. Then, the ICMP filtering unit 4 notifies the ICMP processing unit 5 that transmission of three ICMP data frames "a" and one ICMP data frame "b" are required to be transmitted.

The ICMP processing unit 5 requests the transmission unit 2 to transmit the three ICMP data frames "a" and the one ICMP data frames "b" that are required to be transmitted from the node apparatus A to the node apparatus Y. The transmission unit 2 filters only four ICMP data frames including the three ICMP data frames "a" and the one ICMP data frame "b", and transmits the four ICMP data frames to the node apparatus Y, instead of a conventional method of transmitting twelve ICMP data frames to the node apparatus Y. As described above, transmission of ICMP data frames is restrained, and thus congestion of networks can be prevented. Additionally, processing performance of the node apparatus A can be increased. Furthermore, data frames that cannot be transmitted or received by a conventional node apparatus because of load on the networks and congestion of the networks can now be transmitted or received efficiently by a node apparatus according to the present invention.

A description will now be given of a method of filtering ICMP data frames based on a system condition of a node apparatus and a condition of a line to a destination, when generating and transmitting the ICMP data frames in a case of detecting failure in transmission of corresponding IP data frames received from another node apparatus. The node apparatus Y shown in FIG. 11 transmits six IP data frames "a" causing generation of the ICMP data frame "a" whose type and code are respectively "03" and "01", four IP data frames "b" causing generation of the ICMP data frame "b" whose type and code are respectively "05" and "01", and two IP data frames "c" causing generation of the ICMP data frame "c" whose type is "04" in one second. The ICMP data frame "a" indicates that the IP data frame "a" cannot reach the node apparatus Z as a destination, based on the ICMP information management database 11. Similarly, the ICMP data frame "b" indicates that a route for transmitting the IP data frame "b" to the node apparatus Z is changed. Additionally, the ICMP data frame "c" indicates that transmission of the IP data frame "c" is restrained.

Figure 13:
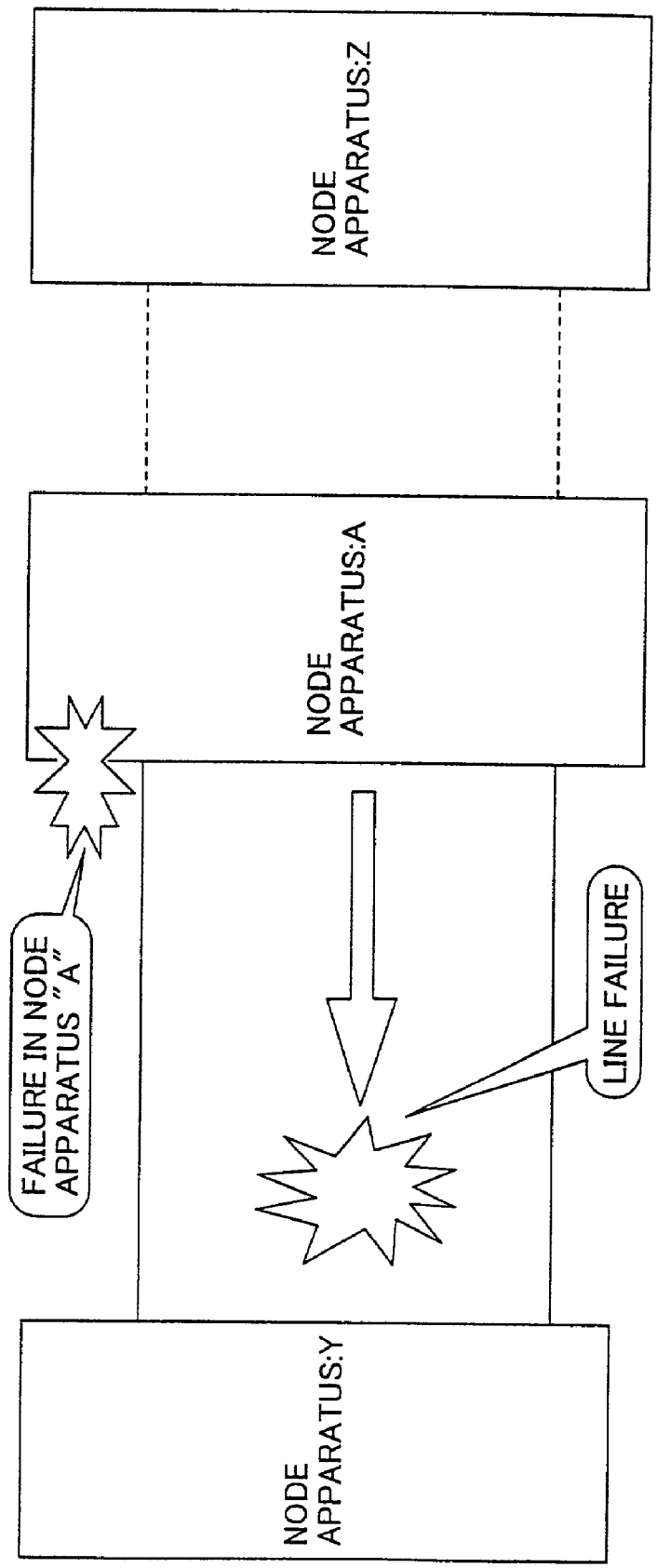
FIG. 13 is a diagram showing the method of generating the ICMP data frame in a case in which a system failure occurs.

The node apparatus A receives the IP data frames transmitted from the node apparatus Y by use of the reception unit 1. Subsequently, the node apparatus A attempts to transmit the IP data frames to the node apparatus Z. However, the node apparatus A detects transmission failure at the reception unit 1, since the node apparatuses A and Z are not connected to each other. The reception unit 1 requests the ICMP processing unit 5 to generate ICMP data frames since the transmission of all the IP data frames received from the node apparatus Y is failed. The ICMP processing unit 5 asks the system-condition management unit 6 about a system condition of the node apparatus A. It is assumed that the system condition of the node apparatus A is a failed condition. The system-condition management unit 6 recognizes that the system condition of the node apparatus A is the failed condition, by referring to the system-condition database 12, and notifies the ICMP processing unit 5 of the failed condition. The ICMP processing unit 5 does not generate the ICMP data frames "a", "b" and "c" corresponding to the IP data frames "a", "b" and "c" respectively. On the other hand, if having generated the ICMP data frames, the ICMP processing unit 5 asks the ICMP filtering unit 4 about the necessity of filtering the ICMP data frames. If the system condition of the node apparatus A is the failed condition, the ICMP filtering unit 4 requests the system-condition management unit 6 to obtain information about the failed condition of the node apparatus A. In response to the request from the ICMP filtering unit 4, the system-condition management unit 6 obtains the information about the failed condition by referring to the system-condition database 12, and notifies the ICMP filtering unit 4 of the information about the failed condition. The ICMP filtering unit 4 having recognized the failed condition of the node apparatus A notifies the ICMP processing unit 5 that all the ICMP data frames "a" and "b" cannot be transmitted from the node apparatus A. The transmission unit 2 of the node apparatus A does not transmit the ICMP data frames to the node apparatus Y, as shown in FIG. 13, since the ICMP processing unit 5 does not request the transmission unit 2 to transmit the ICMP data frames.

Additionally, the ICMP filtering unit 4 makes the system-condition database 12 including information about system conditions and the line-condition database 13 including information about line conditions further include information about the necessity of transmitting the ICMP data frames and the transmission rate of the ICMP data frames, similarly to the ICMP information management database 11, thereby enabling filtering of the ICMP data frames.

Accordingly, by restraining generation and transmission of ICMP data frames, based on a system condition of a node apparatus or a condition of a line connecting the node apparatus and a destination of IP data frames, the node apparatus can avoid an increase in the number of the ICMP data frames transmitted to a transmission source of the IP data frames, thereby achieving improvement of processing performance of the node apparatus, an increase in efficiency of networks, and prevention of congestion of the networks. Additionally, a node apparatus according to the present invention can efficiently transmit or receive data frames that are unable to be transmitted or received by a conventional node apparatus because of load on the networks and congestion of the networks.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-208855, filed on Jul. 10, 2000, the entire contents of which are hereby incorporated by reference.

What is claimed is:

1. A method of transmitting an ICMP (Internet Control Message Protocol) data frame to a transmission source in response to an IP (Internet Protocol) data frame received from the transmission source when detecting a failure of the IP data frame, said method comprising the steps of:
   storing information about necessity of generating the ICMP data frame for each attribute of the ICMP data frame corresponding to a type of the failure;
   determining the necessity of generating the ICMP data frame based on said stored information and a cause of the failure of the IP data frame, which cause is received when the failure is detected;
   generating the ICMP data frame if it is determined that generation of the ICMP data frame is necessary; and
   transmitting the ICMP data frame to the transmission source if the ICMP data frame is generated.

2. A method of transmitting an ICMP data frame to a transmission source in response to an IP (Internet Protocol) data frame received from the transmission source when detecting failure regarding the IP data frame, said method comprising the steps of:
   storing information about necessity of transmitting the ICMP data frame and a transmission rate of the ICMP data frame for each attribute of the ICMP data frame corresponding to a type of the failure;
   generating the ICMP data frame when detecting the failure;
   determining the necessity of transmitting the ICMP data frame by referring to the information;
   filtering the ICMP data frame, based on the transmission rate if it is determined that transmission of the ICMP data frame is necessary; and
   transmitting the ICMP data frame to the transmission source, if the ICMP data frame is filtered.

3. A node apparatus transmitting an ICMP data frame to a transmission source in response to an IP data frame received from the transmission source when detecting failure regarding the IP data frame, said node apparatus comprising:
   an information database storing information about necessity of generating the ICMP data frame for each attribute of the ICMP data frame corresponding to a type of the failure;
   an information management unit determining the necessity of generating the ICMP data frame based on said information stored in said information database and a cause of the failure of the IP data frame, which cause is received when said node apparatus detects the failure; and
   a processing unit generating the ICMP data frame if said information management unit determines that generation of the ICMP data frame is necessary,
   wherein said node apparatus transmits the ICMP data frame to the transmission source if said processing unit generates the ICMP data frame.

4. A node apparatus transmitting an ICMP data frame to a transmission source in response to an IP data frame received from the transmission source when detecting failure regarding the IP data frame, said node apparatus comprising:
   an information database storing information about necessity of generating the ICMP data frame for each attribute of the ICMP data frame corresponding to a type of the failure;
   an information management unit determining the necessity of generating the ICMP data frame by referring to said information database when said node apparatus detects the failure; and
   a processing unit generating the ICMP data frame if said information management unit determines that generation of the ICMP data frame is necessary,
   wherein said node apparatus transmits the ICMP data frame to the transmission source if said processing unit generates the ICMP data frame;
   said node apparatus further comprising:
   a system-condition database storing information about the necessity of generating the ICMP data frame in accordance with a system condition of said node apparatus; and
   a system-condition management unit determining the necessity of generating the ICMP data frame by referring to said system-condition database when said node apparatus detects the failure, wherein said processing unit generates the ICMP data frame if said system-condition management unit determines that the generation of the ICMP data frame is necessary.

5. A node apparatus transmitting an ICMP data frame to a transmission source in response to an IP data frame received from the transmission source when detecting failure regarding the IP data frame, said node apparatus comprising:

an information database storing information about necessity of transmitting the ICMP data frame and a transmission rate of the ICMP data frame for each attribute of the ICMP data frame corresponding to a type of the failure;

a processing unit generating the ICMP data frame when said node apparatus detects the failure;

an information management unit determining the necessity of transmitting the ICMP data frame by referring to said information database; and a filtering unit filtering the ICMP data frame, based on the transmission rate if said information management unit determines that transmission of the ICMP data frame is necessary, wherein said node apparatus transmits the ICMP data frame to the transmission source if the ICMP data is filtered by said filtering unit.

6. The node apparatus as claimed in claim 5, further comprising:

a system-condition database storing information about necessity of generating the ICMP data frame in accordance with a system condition of said node apparatus; and a system-condition management unit determining the necessity of generating the ICMP data frame by referring to said system-condition database when said node apparatus detects the failure, wherein said processing unit generates the ICMP data frame if said system-condition management unit determines that generation of the ICMP data frame is necessary.

7. A node apparatus transmitting an ICMP data frame to a transmission source in response to an IP data frame received from the transmission source when detecting failure regarding the IP data frame, said node apparatus comprising:

an information database storing information about necessity of generating the ICMP data frame, necessity of transmitting the ICMP data frame, and a transmission rate of the ICMP data frame for each attribute of the ICMP data frame corresponding to a type of the failure;

an information management unit determining the necessity of generating the ICMP data frame, the necessity of transmitting the ICMP data frame, and the transmission rate, by referring to said information database when said node apparatus detects the failure;

a processing unit generating the ICMP data frame if said information management unit determines that generation of the ICMP data frame is necessary; and a filtering unit filtering the ICMP data frame generated by said processing unit, based on the transmission rate if said information management unit determines transmission of the ICMP data frame is necessary, wherein said node apparatus transmits the ICMP data frame to the transmission source if the ICMP data frame is filtered by said filtering unit.

8. The node apparatus as claimed in claim 7, further comprising:

a system-condition database storing information about the necessity of generating the ICMP data frame in accordance with a system condition of said node apparatus; and a system-condition management unit determining the necessity of generating the ICMP data frame by referring to said system-condition database when said node apparatus detects the failure, wherein said processing unit generates the ICMP data frame if said system-condition management unit determines that the generation of the ICMP data is necessary.

9. The node apparatus as claimed in claim 8, wherein said system-condition database further storing information about the necessity of transmitting the ICMP data frame and the transmission rate of the ICMP data frame in accordance with the system condition, said system-condition management unit determines the necessity of transmitting the ICMP data frame by referring to said system-condition database, and said filtering unit filters the ICMP data frame generated by said processing unit, based on the transmission rate if said system-management unit determines that the transmission of the ICMP data frame is necessary.

10. The node apparatus as claimed in claim 7, further comprising:

a line-condition database storing information about the necessity of generating the ICMP data frame in accordance with a condition of a line connecting said node apparatus and a destination of the IP data frame; and a line-condition management unit determining the necessity of generating the ICMP data frame by referring to said line-condition database when said node apparatus detects the failure, wherein said processing unit generates the ICMP data frame if said line-condition management unit determines that the generation of the ICMP data is necessary.

11. The node apparatus as claimed in claim 10, wherein said line-condition database further storing information about the necessity of transmitting the ICMP data frame and the transmission rate of the ICMP data frame in accordance with the line condition, said line-condition management unit determines the necessity of transmitting the ICMP data frame by referring to said line-condition database, and said filtering unit filters the ICMP data frame generated by said processing unit, based on the transmission rate if said line-management unit determines that the transmission of the ICMP data frame is necessary.

* * * * *